Feb. 18, 1969    J. J. J. STAUNTON ET AL    3,428,432
ANALYTICAL COMBUSTION TRAIN
Filed July 6, 1964
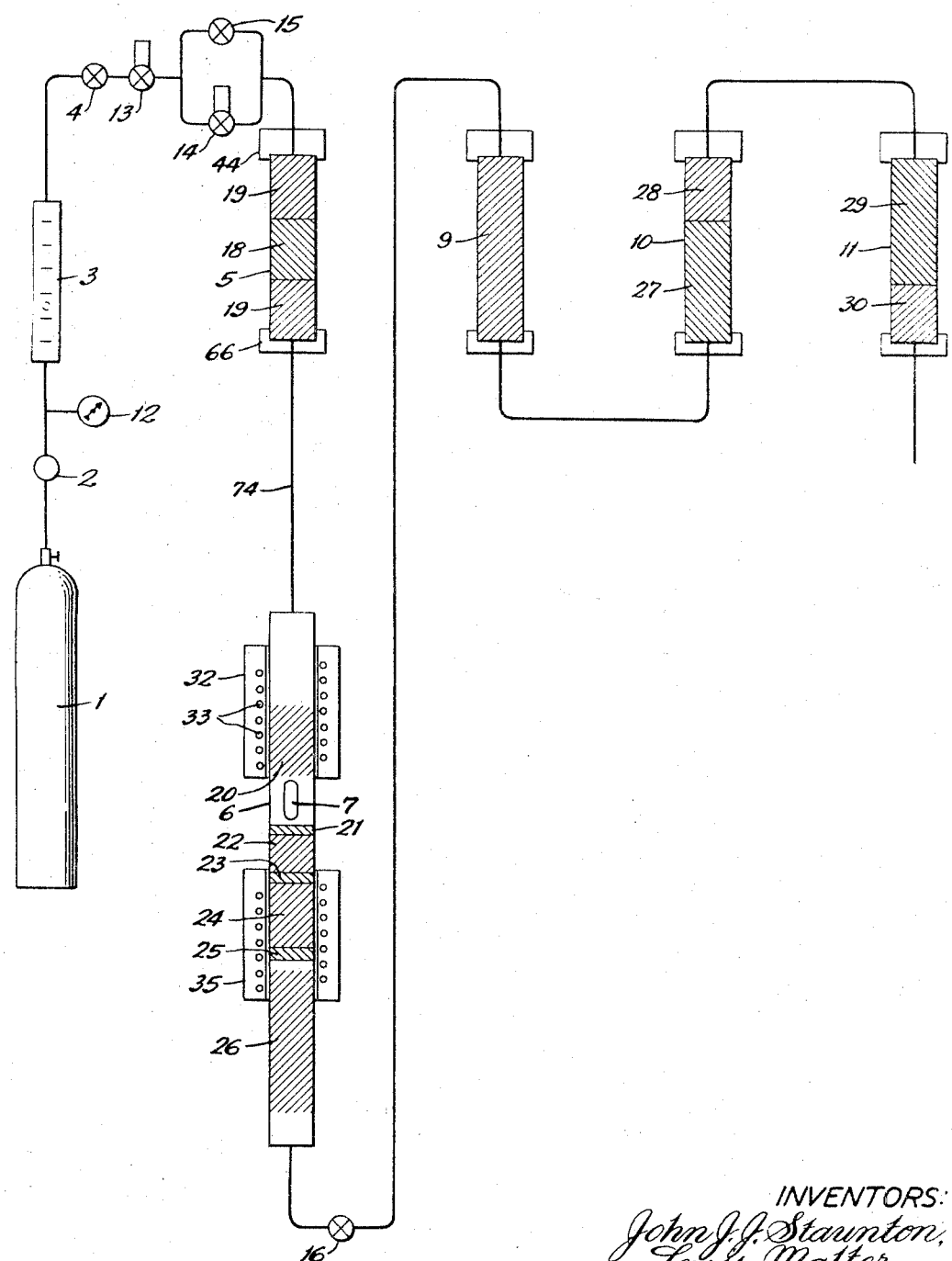
INVENTORS:
John J. J. Staunton,
Lewis Matter,
William J. Gleason
and Rame W. Bull,
BY Barr, Freeman & Molinare ATTORNEYS.

United States Patent Office 3,428,432
Patented Feb. 18, 1969

3,428,432
ANALYTICAL COMBUSTION TRAIN
John J. J. Staunton, 310 Wesley Ave., Oak Park, Ill. 60302, Lewis Malter, 7741 Davis St., Morton Grove, Ill. 60053, William J. Gleason, 408 N. 2nd Ave., Villa Park, Ill. 60181, and Rame W. Bull, 619 S. George St., Mount Prospect, Ill. 60056
Continuation-in-part of application Ser. No. 91,713, Feb. 27, 1961. This application July 6, 1964, Ser. No. 380,601
U.S. Cl. 23—253                4 Claims
Int. Cl. G01n 25/22, 31/00

ABSTRACT OF THE DISCLOSURE

An analytical combustion train having a vertical combustion chamber and a plurality of vertical absorption vessels. Oxygen at a controlled flow rate is fed through the vertical combustion chamber to react with a sample supported on a uniformly packed, dry particulate material. The reaction products continue through various vertical vessels arranged in series, each vessel containing materials which absorb a particular reaction product. The oxygen flow rate is variable to accelerate combustion and absorption.

---

This inventon relates to an improved construction for an analytical train used in chemical analytical procedures. The present application is a continuation-in-part of our copending application Ser. No. 91,713, filed Feb. 27, 1961, now Letters Patent No. 3,167,396. Such procedures often involve the analysis of a material by heating it so as to pyrolyze it or break it down into its components. These components are then reacted with a stream of gas and the reaction products are absorbed into material which can be weighed, or the products may be analyzed by some other method such as titration, colorimetry, or by volumetric methods. The combustion train is the device in which the initial pyrolysis or combustion is completed.

In the conventional combustion train the sample to be analyzed is disposed within a tube, as are the absorbing materials. These tubes are disposed in horizontal position. A horizontally disposed combustion or absorption tube must be very tightly packed so that the motion of the gas flowing through the tube will not jiggle the grains of packing material and cause them to settle to the bottom of the tube, leaving a clear path or channel along the top side of the tube through which the gas flows. Under such conditions the flowing gas will not contact uniformly the packing within the tube. Furthermore, when the packing is tight to minimize the channeling and settling the resistance of the tube to fluid flow is greatly increased because of the friction. Another disadvantage of the conventional horizontal combustion and absorption tubes lies in the fact that water deposits on the walls of the tube and settles to the bottom, where it is difficult to pick up the flowing gas.

A primary object of the present invention is to eliminate the foregoing objections by providing a combustion train in which the combustion and absorption tubes are vertically disposed. We have found that such vertical tubes need not be tightly packed because no amount of agitation by the gas can cause channeling. The gas flows through the entire cross section of the tube in contact with substantially all of the particles comprising the packing. Such packings are referred to in the claims as "solid particulate material." Consequently, the rate at which the gas flows through the train can be greatly increased to speed up the analysis and permit analysis of larger samples because more gas is available to carry out the combustion process in a given time. Moreover, the higher flow rate also causes the water vapor in the tube to become entrained more readily and carried farther down the train before condensation takes place. Thus the water absorbing material can be placed at a point well separated from the combustion tube. This gives the gas stream time to cool and the water absorber is not heated either by the gas stream or by the proximity of the furnaces used to heat the combustion tube.

Other advantages result from the use of a combustion train in which the tube members are vertically disposed: greater ease of operation, increased accuracy, prompt results, lower cost, a wider variety in the state and size of the sample, ready adaptability to many different analytical procedures, and a great saving in bench top space. Three or more complete instruments constructed in accordance with the present invention may be mounted in the same space used by only one of the prior conventional instruments.

Another object of the invention is to provide a vertically disposed analytical combustion train in which means is provided for feeding reactant gas through the train at two different flow rates. During the initial portion of the analysis the flow of reactant gas must be slow to permit complete combustion of the sample. Subsequently, it is desirable to move the reaction products through the train as rapidly as the absorption tubes can handle them. In this way maximum efficiency is obtained.

These and other objects and advantages of our invention will be apparent from the following description, when read in conjunction with the accompanying drawing, in which the single figure is a semi-diagrammatic illustration of an analytical combustion train constructed in accordance with the invention.

The analytical combustion train shown in the drawing is especially adapted for use as a hydrogen and carbon analyzer for nonmetallic materials which volatilize below 1000° C. It will be understood, however, that this invention is also suitable for use nitrogen analyzers and for the analysis of other non-metallic chemicals which utilize combustion trains and absorption tubes in their analysis. By using different carrier gases and different measurement sections such as titrators, colorimeters, conductivity cells, or other readout devices, and appropriately programming the system, such things as sulfur, halogens, phosphorus, oxygen and other sample constitutents can be determined. With all of these the novel advantages of our system will obtain in greater or lesser degree.

Referring specifically to the drawing, an oxygen tank is identified by the numeral 1 and serves to provide oxygen for the analysis. In the conduit between the oxygen cylinder 1 and the absorption tube 5 we have provided a number of devices for measuring and regulating the flow of oxygen to the train. These include a regulator 2, a pressure indicating gauge 12, a flow meter 3, and a high flow regulating valve 4. For automatic operation a pair of solenoid valves are provided in series and are designated at 13 and 14. A low flow regulating valve 15 is provided in a by-pass conduit. By manually adjusting the high flow regulating valve 4 the gas may flow at a rate ranging between 100 and 200 cubic centimeters per minute. Gas flows at this rate to the absorber 5 when both solenoid valves 13 and 14 are open A lower flow rate may be obtained when the solenoid valve 14 is closed and the low flow regulating valve 15 is opened and manually adjusted to the desired lower flow rate say between 15 and 50 cc. per minute. The solenoid valves 13 and 14 may be controlled by a timer on the instrument which is not shown. When solenoid valve 13 is closed, flow to the train is shut off completely. The pre-heat absorption tube 5 is packed in the center with Ascarite which is a commercial preparation consisting of sodium hydroxide on asbestos and is identified in the drawing by the numeral 18. The upper and lower thirds of the tube are filled with magnesium perchlorate or magnesium perchlorate-coated vermiculite, identified by the numeral 19. The upper layer of perchlorate removes moisture from the oxygen, the middle layer removes carbon dioxide, and the lower layer removes any further moisture released during passage through the middle layer.

The lower end of the tube 5 connects to the upper end of the combustion tube 6 which contains a platinum wire gauze choke 20 to stop back travel of reaction products during combustion. The sample to be analyzed is designated by the numeral 7 and is disposed downstream of the platinum wire choke. Two bodies of copper oxide granules 22, 24 are disposed between quartz wool plugs 21 and 25. Interposed between the two bodies of copper oxide granules is a layer of platinized asbestos 23 which catalyzes the combustion reactions and breaks down hydrocarbon radicals such as methane. The first body of copper oxide granules disperses and heats the combustion gas stream, and the second body of copper oxide granules 24 provides further mixing and heating. Both also serve as a supplemental source of oxygen for use if the demand is greater than the supply being fed from cylinder 1. A roll of silver gauze 26 is disposed in the bottom of the tube to support the packings and sample above and to remove the halogens and sulfur. The silver gauze, because of its high conductivity, also conducts heat to the bottom of the tube to keep the water in the stream in vapor form. Electric furnaces 32, 35 having resistance coils 33 are mounted for movement along the tube 6, which they embrace. The furnaces provide the heat for combustion of the sample 7, and for heating the granules 22, 24 and gauze 26.

In the relatively long conduit between the bottom of the combustion tube 6 and the top of the absorption tube 9 we have provided a vent valve 16 to permit purge oxygen at the beginning of a run to escape to the atmosphere carrying with it air and moisture. As gas passes through the long conduit it is cooled by transfer of heat to the air surrounding the conduit. Absorption tube 9 contains a packing of magnesium perchlorate to absorb water formed during combustion. The weight of this water is a measure of the hydrogen content of the sample. The water absorption tube 9 connects to a scrubber 10 containing manganese dioxide 27 for removing the oxides of nitrogen and certain other unwanted combustion products. A packing of magnesium perchlorate 28 removes any water given up by the manganese dioxide packing. The tube 10, 11 and the pretreat tube 5 function through a number of analytical cycles before exhaustion of their contents necessitates replacement. Another conduit connects the top of the scrubber 10 to the top of the carbon dioxide absorption tube 11. Tube 11 is packed with Ascarite 29 for absorbing the carbon dioxide in the gas stream, and the moisture given off by the Ascarite is reabsorbed in the magnesium perchlorate packing designated by the numeral 30 in the bottom of the tube 11. The excess oxygen and unabsorbed gases are vented to the atmosphere.

It will be appreciated from a consideration of the foregoing description that the packing in vertically disposed tubes will remain uniformly distributed across the entire cross section of the tube so that uniform contact between the gases and the absorption media is obtained. In analyzing large samples which raise the moisture content of the gas stream, the high flow rate (over 100 cubic centimeters per minute) afforded by the loose packing is particularly effective in keeping this moisture moving through the train. The high flow rate causes the moisture particles to become entrained in the flowing gas. It will be noted that the absorption tube 9 has been placed at a point well separated from the combustion tube. This is possible because the moisture is carried by the swiftly moving gas stream into the absorber rather than being deposited within the conduit. Because the gas stream has time to cool, the water absorber tube is not hot and it may be removed promptly for weighing. There is no drift of the tube's weight due to cooling, nor is there any inaccuracy caused by suction of room air and moisture into the tube as it cools. This is a common source of trouble in the prior art trains. It is therefore apparent that a further feature of our system is the increase in speed and accuracy of the water (hydrogen) determination.

It must not be conjectured that a simple increase in rate of flow of the gas, if this were possible in the prior art horizontal system, would give the same resuls as those just explained. To simply increase the flow rate of any given system would be impractical. During the first part of the combustion a slow flow rate (about 15 cc. per minute) is highly desirable because at this time a large evolution of volatiles is given off by the sample and time must be allowed in the combustion tube to break down and react these with the carrier gas. Also a high flow rate during this part of the cycle would minimize deep penetration of the absorbing material by the gas. For example, if all of the oxides of nitrogen were not absorbed by the manganese dioxide absorber 27 they would carry over into the $CO_2$ absorber 11 and give faulty results. In accordance with the present invention, we have incorporated the double flow feature previously mentioned whereby the slow flow rate is programmed throughout the initial combustion period and then a faster flow rate (over 100 cc. per minute) comes into action to pick up the water as previously explained. This novel combination sweep also makes possible the use of a smaller scrubber 10 because it gives better use of the absorbing power of the packing, and makes possible much more rapid analyses.

The effective water absorption of the tube 9 by reason of the invention is of importance. By bringing the water, vapor, or condensate into the top of the tube the water will deposit on the top of the packing and then, urged by the gas stream, will flow down through the tube, becoming effectively and uniformly entrained in the interstices of the packing. This greatly increases the amount of water than can be picked up as compared with a packing disposed in a horizontal tube. To further this effect even more, we have used carrier based anhydrous magnesium perchlorate, where the carrier is a highly porous vermiculite, to increase the absorptive efficiency. This has the advantage that, whereas the granular magnesium perchlorate will puddle and become wet at the top of the tube if a large amount of water comes through and will then also absorb oxides of nitrogen causing error, the carrier based perchlorate will not become wet but will spread its water pickup throughout the length of the tube, eliminating the above difficulty. As a result, we have been able to reduce the size of the absorber tubes while still maintaining capacity to handle large samples.

The reduction in the size of the absorber tube is in itself an important contribution to accuracy of measurement. We have been able, through means previously described, to keep the weight of tubes 9 and 11 with contents below 20 grams. This makes it possible to weigh these tubes on a modern one-pan balance to a degree of accuracy which would be impractical with a heavier tube. In addition, considerable time is saved by the use of such a balance. The means for mounting the tubes in the train is set forth in detail in our copending application Ser. No. 91,713 filed Feb. 27, 1961.

We claim:

1. An analytical combustion train comprising a plurality of interconnected vertically-disposed tubes including a vertical combustion tube packed with particulate material for supporting a sample to be analyzed and for dispersing reactant gas flowing through said combustion tube, a vertical absorption tube containing water-absorbing particulate material filling the cross section thereof, and means upstream of said combustion tube for passing said reactant gas into said train at two different flow rates alternatively, whereby an initial slow rate is utilized during combustion of said sample and reaction therewith, and a subsequent fast rate is utilized to entrain water vapor in the flowing combustion gas stream to carry said vapor to said absorption tube.

2. The train of claim 1 in which said train includes a vent valve disposed immediately downstream of said combustion tube.

3. The train of claim 1 in which said absorption tube is connected to said combustion tube by a conduit sufficiently long to cool the combustion gases flowing therethrough so that the temperature of said absorption tube does not increase substantially above room temperature.

4. The train of claim 3 in which said conduit connects to the top of said absorption tube.

References Cited

UNITED STATES PATENTS 1,382,072   6/1921   Finkl.
2,754,178   7/1956   Mack.
3,281,214   10/1966   Stein _____ 23—253 XR

OTHER REFERENCES

Hagerman, D. B., Anal. Chem., vol. 19, No. 6, June 1947, pp. 381–383.

MORRIS O. WOLK, *Primary Examiner.*

R. M. REESE, *Assistant Examiner.*

U.S. Cl. X.R.

23—230